(12) United States Patent
Levi et al.

(10) Patent No.: US 12,277,471 B2
(45) Date of Patent: Apr. 15, 2025

(54) AUTOMATED REMOVAL OF SECURITY TAGS

(71) Applicant: Paytag Ltd., Kfar Saba (IL)

(72) Inventors: Ori David Levi, Kfar Saba (IL); Barak Amtanani, Kfar Saba (IL)

(73) Assignee: Paytag Ltd., Kfar Saba (IL)

( * ) Notice: Subject to any disclaimer, the term of this patent is extended or adjusted under 35 U.S.C. 154(b) by 0 days.

(21) Appl. No.: 18/487,146

(22) Filed: Oct. 16, 2023

(65) Prior Publication Data
US 2024/0037352 A1 Feb. 1, 2024

Related U.S. Application Data

(63) Continuation-in-part of application No. PCT/IL2022/050562, filed on May 26, 2022.

(60) Provisional application No. 63/195,072, filed on May 31, 2021.

(51) Int. Cl.
*G06K 7/10* (2006.01)

(52) U.S. Cl.
CPC .............................. *G06K 7/10366* (2013.01)

(58) Field of Classification Search
CPC .................................................. G06K 7/10366
USPC ........................................................ 235/451
See application file for complete search history.

(56) References Cited

U.S. PATENT DOCUMENTS

| | | | | |
|---|---|---|---|---|
| 9,460,597 | B1 * | 10/2016 | Clark | G08B 13/246 |
| 2014/0232531 | A1 * | 8/2014 | Stewart | G07G 1/0054 |
| | | | | 340/10.5 |
| 2017/0046707 | A1 | 2/2017 | Krause et al. | |
| 2017/0330435 | A1 * | 11/2017 | Skjellerup | E05B 73/0064 |
| 2018/0374327 | A1 | 12/2018 | Enekwa et al. | |
| 2019/0221093 | A1 * | 7/2019 | Perez | G08B 13/2434 |
| 2020/0224460 | A1 * | 7/2020 | Miller | E05B 73/0017 |
| 2021/0012634 | A1 * | 1/2021 | Claeys | E05B 47/0012 |
| 2021/0110688 | A1 * | 4/2021 | Udumalagala | G08B 13/2411 |
| 2023/0153831 | A1 * | 5/2023 | Budano | G06Q 30/0185 |
| | | | | 705/318 |

(Continued)

FOREIGN PATENT DOCUMENTS

WO 2016201311 A1 12/2016

OTHER PUBLICATIONS

Amazon Web Services, Inc., "Amazon Relational Database Service," p. 1, Oct. 2021, as downloaded from https://web.archive.org/web/20220906040548/https://docs.aws.amazon.com/AmazonRDS/latest/APIReference/rds-api.pdf#Welcome.

(Continued)

*Primary Examiner* — Allyson N Trail
(74) *Attorney, Agent, or Firm* — Meitar Patents Ltd.; Daniel Kligler

(57) ABSTRACT

A method for security tag removal includes providing a terminal comprising a receptacle, which is configured to receive a magnetic security tag that is attached to an item of merchandise. A wireless transceiver in the terminal reads identification data that is encoded in the security tag while the security tag is in the receptacle. A query is transmitted from the terminal to a server with respect to the identification data. In response to the query, an authorization is received from the server with respect to the item of merchandise to which the security tag is attached. In response to the authorization, a magnet in the terminal is actuated so as to release the security tag from the item of merchandise.

20 Claims, 6 Drawing Sheets

(56) References Cited

U.S. PATENT DOCUMENTS

2023/0417084 A1* 12/2023 Lynch ................ G08B 13/2434

OTHER PUBLICATIONS

Amazon Web Services, Inc., "What is Amazon Elastic Container Registry?", user guide, pp. 1-3, Sep. 21, 201516/https://aws.amazon.com/.

Docker Inc., "Use containers to Build, Share and Run your applications", pp. 1-9, year 2023, as downloaded from https://web.archive.org/web/20230902074514/https://www.docker.com/resources/what-container/.

Amazon Web Services, Inc., "Amazon S3 Features", pp. 1-8, year 2023 as downloaded from https://web.archive.org/web/20230525230629/https://aws.amazon.com/s3/features/.

Amazon Web Services, Inc., "Overview of Amazon Web Services", AWS Whitepaper, pp. 1-85, Aug. 5, 2021.

International Application # PCT/IL2022/050562 Search Report dated Aug. 16, 2022.

* cited by examiner

AUTOMATED REMOVAL OF SECURITY TAGS

CROSS-REFERENCE TO RELATED APPLICATION

This application is a continuation in part of PCT Patent Application PCT/IL2022/050562, filed May 26, 2022, which claims the benefit of U.S. Provisional Patent Application 63/195,072 filed May 31, 2021. Both these related applications are incorporated herein by reference.

FIELD

The present invention relates generally to electronic and electromechanical systems, and particularly to computer-controlled magnetic actuators.

BACKGROUND

Security tags are widely used to protect against shoplifting from retail stores. Tags containing radio transceivers are attached securely to items of merchandise, such as clothing. When a customer purchases an item, the store clerk uses a dedicated magnetic tag remover to detach the tag from the item. If a person attempts to remove an item of merchandise from the store with the tag still attached, a detector near the store exit will detect the radio transceiver and will typically set off an alarm.

PCT International Publication WO 2016/201311 describes systems and methods for operating a security tag. The methods involve establishing an electrical connection between the security tag and an external Power Removal Station ("PRS"); performing operations by the security tag to authenticate a detach command sent from the external PRS; allowing power to be supplied from the external PRS to an electromechanical component of the security tag when the detach command is authenticated; and actuating the electromechanical component so that a pin of the security tag transitions from an engaged position to an unengaged position without any human assistance or mechanical assistance by a device external to the security tag.

SUMMARY

Embodiments of the present invention that are described hereinbelow provide improved systems, devices, and methods for handling of magnetic security tags.

There is therefore provided, in accordance with an embodiment of the invention, an electromechanical device, which includes a case, including a receptacle configured to receive a magnetic security tag that is attached to an item of merchandise. A wireless transceiver, which is contained in the case, is configured to read identification data that is encoded in the security tag while the security tag is in the receptacle. A tag removal mechanism, which is contained in the case, includes a magnet and is configured to shift the magnet between an actuation position in proximity to the receptacle and a rest position in which the magnet is farther from the receptacle than in the rest position. A controller is configured to receive the identification data from the wireless transceiver, to transmit, via a network communication interface, a query to a server with respect to the identification data, to receive, via the network communication interface, an authorization from the server with respect to the item of merchandise to which the security tag is attached, and responsively to the authorization, to actuate the tag removal mechanism to shift the magnet to the actuation position so as to release the security tag from the item of merchandise.

In a disclosed embodiment, the receptacle includes an indentation having a size and shape chosen to match a protrusion of the magnetic security tag. Additionally or alternatively, the wireless transceiver includes a near-field communication (NFC) reader.

In some embodiments, the tag removal mechanism includes a motion arm having a first end to which the magnet is attached, and an actuator coupled to move a second end of the motion arm, opposite the first end, so as to shift the magnet from the rest position to the actuation position in response to an actuation signal from the controller. In a disclosed embodiment, the motion arm includes a rotational pivot between the first and second ends of the motion arm, and the actuator is coupled to shift the second end so as to rotate the motion arm about the pivot, thereby rotating the first end between the rest position and the actuation position. In one embodiment, the actuator includes a solenoid.

In a disclosed embodiment, the controller is configured to actuate the tag removal mechanism to release the security tag only while the wireless transceiver indicates that the security tag for which the authorization was received is in the receptacle.

In some embodiments, the apparatus includes a display screen, wherein the controller is coupled to present information on the display screen regarding the authorization with respect to the item of merchandise. In a disclosed embodiment, the authorization indicates that a customer has purchased the item of merchandise, and the controller is configured, in response to a message from the server, to present a notification on the display screen indicating that purchase of the item has not been completed.

There is also provided, in accordance with an embodiment of the invention, a method for security tag removal. The method includes providing a terminal including a receptacle, which is configured to receive a magnetic security tag that is attached to an item of merchandise. Using a wireless transceiver in the terminal, identification data that is encoded in the security tag is read while the security tag is in the receptacle. A query is transmitted from the terminal to a server with respect to the identification data. In response to the query, an authorization is received from the server with respect to the item of merchandise to which the security tag is attached. In response to the authorization, a magnet in the terminal is actuated so as to release the security tag from the item of merchandise.

In one embodiment, actuating the magnet includes applying a current to an electromagnet.

Additionally or alternatively, actuating the magnet includes releasing the security tag only while the wireless transceiver indicates that the security tag for which the authorization was received is in the receptacle.

In a disclosed embodiment, presenting information via a user interface of the terminal regarding the authorization with respect to the item of merchandise.

The present invention will be more fully understood from the following detailed description of the embodiments thereof, taken together with the drawings in which:

DETAILED DESCRIPTION

Overview

The above-mentioned PCT Patent Application PCT/IL2022/050562 describes a retail system that may be operated by a self-checkout customer to remove and/or disable a security tag, using self-service tag disabling station. The system may enable a buyer to buy a product without the need to conduct the transaction with a store employee. For example, the customer may buy the product over a network using his own personal computing device (such as a cellphone). Each security tag may include an identifier. Once the product is bought, the identifier of the tag is sent to a database. The self-service tag disabling station allows the user to disable and/or remove tags identified in the database as having been sold.

Embodiments of the present invention that are described herein provide a self-service tag disabling terminal that enables efficient, reliable removal of magnetic security tags by customers without involvement of store personnel. The terminal comprises a magnetic tag removal mechanism, which is actuated only after the device controller verifies, by communication with a server, that removal of the security tag has been authorized (typically because payment has been received for the item of merchandise to which the security tag is attached). A wireless transceiver, such as a near-field communication (NFC) transceiver, in the device identifies the security tag that is to be removed and thus protects against unauthorized tag removal.

In the disclosed embodiments, the electromechanical tag-removal device comprises a case with a receptacle that is sized and shaped to receive a magnetic security tag that is attached to an item of merchandise. A wireless transceiver in the case reads identification data that is encoded in the security tag while the security tag is in the receptacle. A tag removal mechanism in the case shifts a magnet between an actuation position in proximity to the receptacle and a rest position in which the magnet is farther from the receptacle. A controller receives the identification data from the wireless transceiver, transmits a query, via a network communication interface, to a server with respect to the identification data, and awaits authorization from the server with respect to the item of merchandise to which the security tag is attached. Upon receiving the authorization, the controller actuates the tag removal mechanism to shift the magnet to the actuation position so as to release the security tag from the item of merchandise.

System Description

Figure 1:
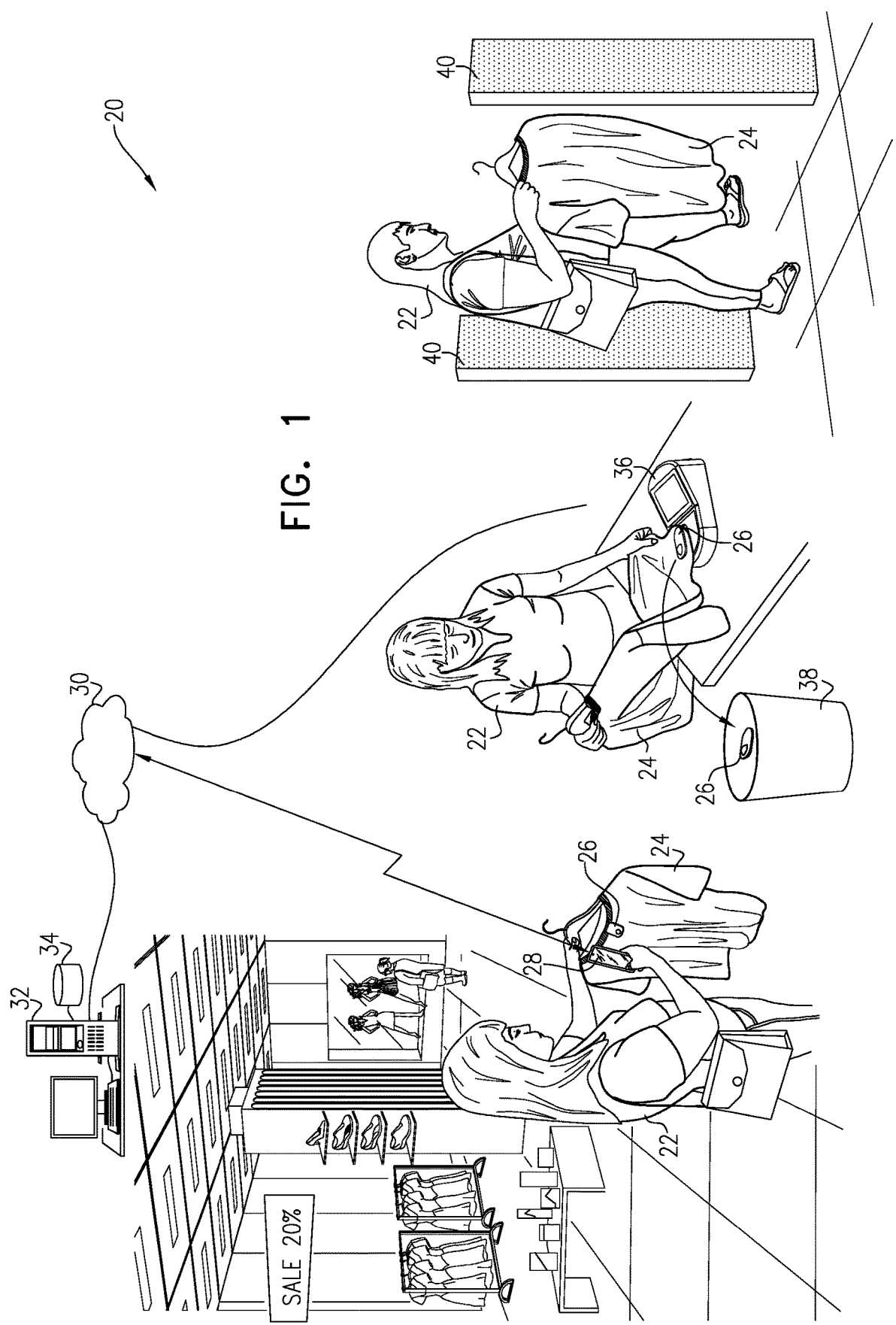
FIG. 1 is a schematic pictorial illustration showing a system for automatic handling of security tags, in accordance with an embodiment of the invention.

FIG. 1 is a schematic pictorial illustration showing stages in the operation of a system 20 for automatic handling of security tags, in accordance with an embodiment of the invention. In the pictured scenario, a customer 22 in a store selects an item of merchandise, such as a garment 24. A magnetic security tag 26, containing identification data, is attached to the garment. For example, the identification data may be encoded as a unique identifier (UID) in a near-field communication (NFC) chip, which is embedded in tag 26. Alternatively, magnetic security tag 26 may use other means for wireless identification, such as Bluetooth Low Energy or other radio frequency identification (RFID) technology.

A purchasing application running on a smartphone 28 used by customer 26 instructs the customer to scan tag 26, for example using the NFC transceiver in the smartphone. The smartphone reads the identification data from the NFC chip in tag 26 and transmits the identification data over a network 30, such as an in-store wireless network and/or a public network, to a server 32. Server 32 looks up the identification data in a database 34, which matches the UID of tag 26 with information concerning garment 24, such as the product description and the price. Server 32 returns this information to smartphone 28, and the purchasing application offers customer 22 the opportunity to purchase garment 24 on-line at the price indicated by the server. Once customer 22 has completed the purchase, the purchasing application on smartphone 28 informs server 32, which updates database 34 accordingly, for example by setting a "paid" flag in the record corresponding to the UID of tag 26.

Customer 22 now takes garment 24 to a tag removal terminal 36 in the store and places tag 26 in a receptacle on the terminal that matches the shape and size of the tag. (Details of terminal 36 are shown in the figures that follow.) A wireless transceiver in terminal 36, for example an NFC transceiver, reads the UID (or other identification information) of the tag while the tag is in the receptacle and transmits, via network 30, a query to server 32 with respect to the UID. Server 32 looks up the UID in database 34, verifies that payment has been received for garment 24, and accordingly returns an authorization via network 30 to terminal 36. If the "paid" flag is not set in the corresponding database record, however, server 32 will return a refusal message to terminal 36. The terminal may then present a message on a display screen indicating that purchase of garment 24 has not been completed and referring the customer to the purchasing application or to store personnel to complete the purchase.

Assuming server 32 provides the appropriate authorization, a tag removal mechanism is actuated in terminal 36 to release tag 26 from garment 24. The authorization message from server 32 indicates the UID of tag 26, and the tag removal mechanism in terminal 36 will release tag 26 only while the NFC transceiver in terminal 36 indicates that the security tag with the UID for which the authorization was received is in the receptacle on the terminal. This connection between the NFC transceiver and the tag removal mechanism ensures that terminal 36 will remove tags only from items that have actually been paid for. Customer 22 may then remove and dispose of tag 26, for example putting the tag in a bin 38. Customer 22 is then able to leave the store without activating anti-theft detectors 40 at the store exit.

Although server 32 is shown in FIG. 1 as being located remotely, the functions of the server may alternatively be implemented on a local computer within the store. Further alternatively, terminal 26 itself may have suitable processing resources, memory, and interface capabilities to verify payment internally, and thus actuate the tag removal mechanism, without communicating with an external server.

Figure 2:
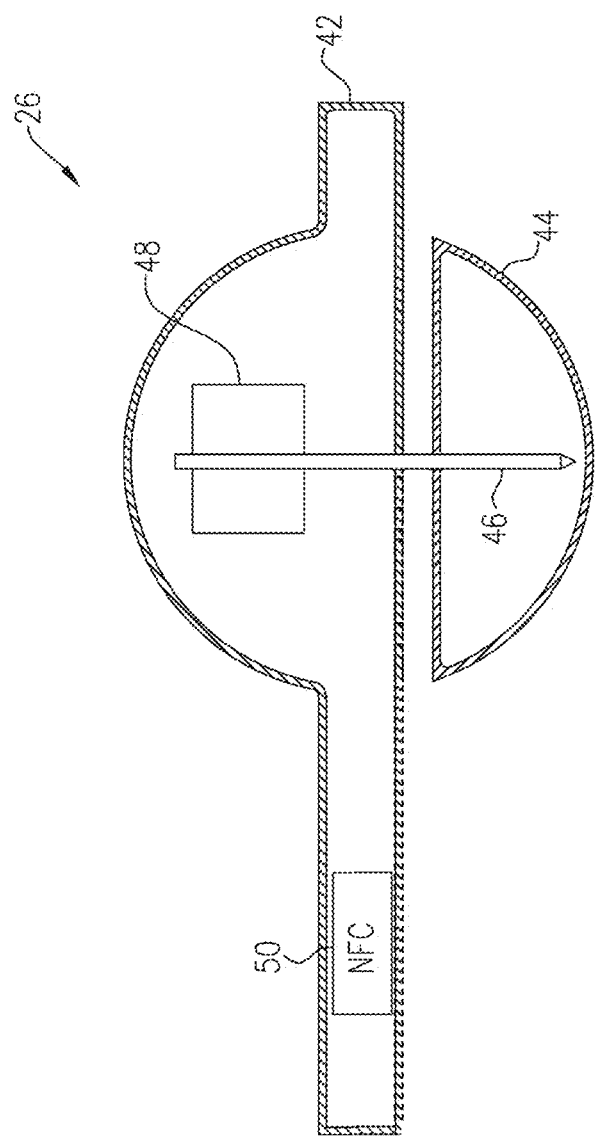
FIG. 2 is a schematic sectional view of a security tag used in the system of FIG. 1.

FIG. 2 is a schematic sectional view of security tag 26. This is just one example of the sorts of tags that can be used in system 20, and terminal 36 may be adapted, *mutatis mutandis*, to remove magnetic security tags of other shapes and forms.

Tag 26 comprises a base 42 and a fastener 44 containing a pin 46, which is held by a magnetic lock 48 in base 42. Lock 48 is released by application of an appropriate magnetic field to base 42 in the area of the lock.

An NFC chip 50 in base 42 contains identification data, for example in the form of a UID encoded in chip 50 by the manufacturer of tag 26. Either chip 50 or another transmitter component (not shown) in tag 26 also interacts with anti-theft detectors 40 to set off an alarm if a customer attempts to take an item out of the store while tag 26 is attached to the item. As noted earlier, although the present description refers specifically to NFC for the sake of clarity and concreteness, tag 26 and terminal 36 may alternatively use other means of short-range wireless communications.

Tag Removal Terminal

Figure 3:
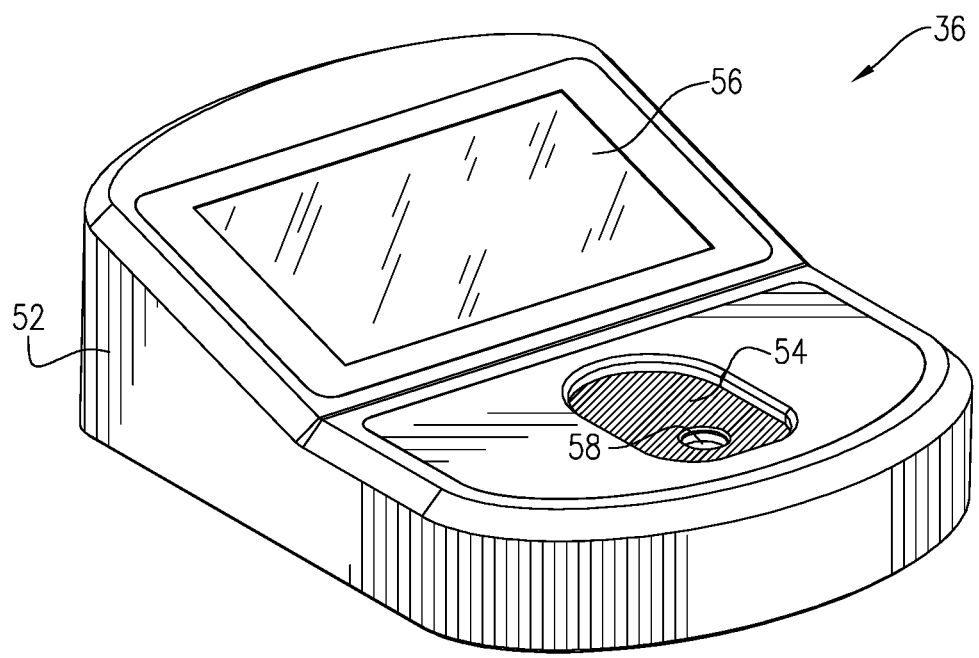
FIG. 3 is a schematic pictorial illustration of a device for removal of security tags, in accordance with an embodiment of the invention.

FIG. 3 is a schematic pictorial illustration of terminal 36 for removal of security tags, such as tag 26, in accordance with an embodiment of the invention. Terminal 36 comprises a case 52, which comprises a receptacle 54 that is sized and shaped to receive magnetic security tag 26 while the tag is attached to an item of merchandise. In the pictured example, receptacle 54 includes an indentation 58, into which the protrusion on tag 26 that contains magnetic lock 48 will fit.

Terminal 36 may also comprise a user interface, such as a display screen 56 for presenting messages to customers using the terminal. For example, display screen 56 may indicate whether or not terminal 36 has received authorization to remove tag 26. The user interface may also enable user input, for example by configuring display screen 56 as a touch screen. Alternatively or additionally, terminal 36 may comprise other user interface components, such as an audio interface and/or indicator lights.

Figure 4:
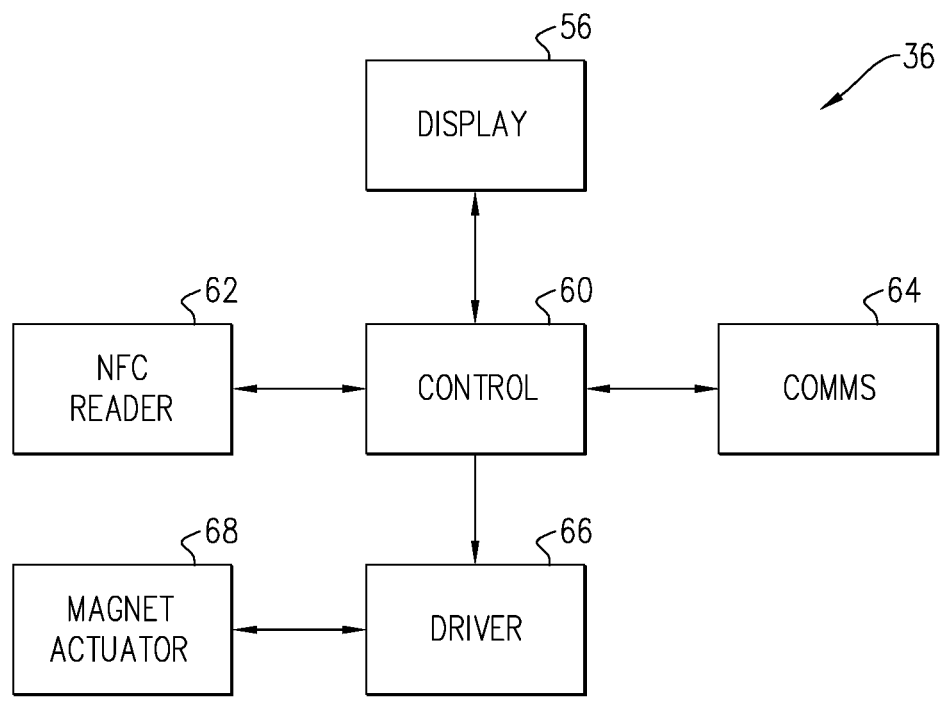
FIG. 4 is a block diagram that schematically shows functional components of a device for removal of security tags, in accordance with an embodiment of the invention.

FIG. 4 is a block diagram that schematically shows functional components of terminal 36, which are contained in case 52, in accordance with an embodiment of the invention. A controller 60 manages and controls the operation of terminal 36, including presenting information on display screen 56. Controller 60 typically comprises a microprocessor or microcontroller, which is programmed in software or firmware to carry out the functions that are described herein. The software may be stored in tangible, non-transitory computer-readable media, such as electronic, magnetic, or optical memory media. Additionally or alternatively, at least some of the functions of controller 60 may be carried out by hardware logic circuits, which may be hard-wired or programmable. Although controller 60 is shown in FIG. 4 as a single functional block, the functions of controller 60 may be distributed among two or more integrated circuit chips (or carried out within a single chip).

A wireless transceiver, such as an NFC reader 62, reads identification data, such as a UID, that is encoded in NFC chip 50 of security tag 26 while the security tag is in receptacle 54. Controller 60 receives the identification data from NFC reader 62 and transmits, via a network communication interface 64, a query to server 32 (FIG. 1) with respect to the identification data, asking whether the UID is flagged as "paid." Network communication interface 64 may comprise either a wireless or a wired network interface (or both).

Upon receiving authorization from server 32 via network communication interface 64, controller 60 actuates a driver circuit 66 to apply an electrical current to an actuator 68, for example a solenoid. Alternatively, other types of electrical actuators and actuation mechanisms may be used. Actuator 68 actuates a tag removal mechanism (shown in FIG. 6) to shift a magnet from a rest position to an actuation position below indentation 58 and thus releases the security tag from the item of merchandise.

Figure 5:
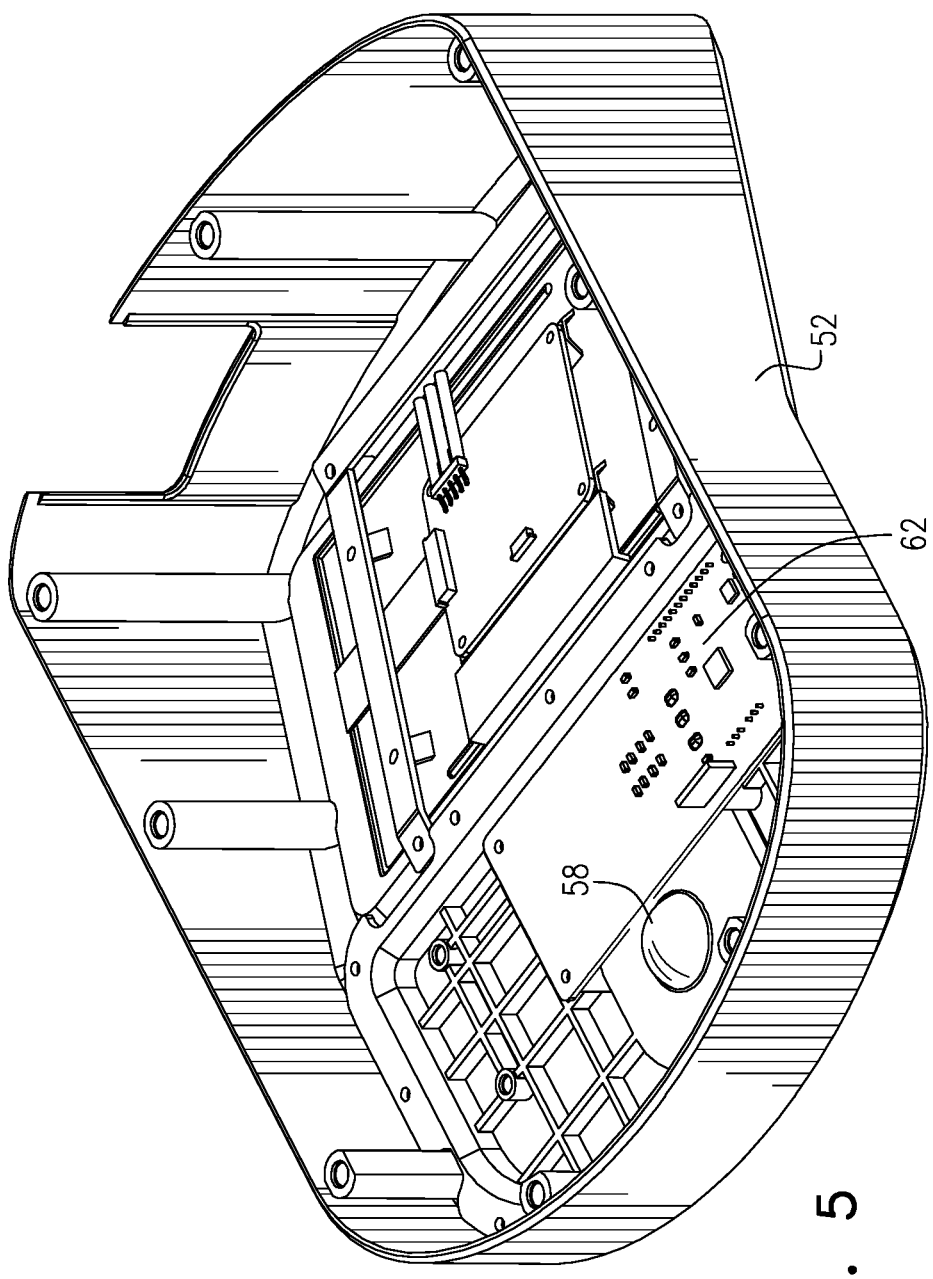
FIGS. 5 and 6 are schematic internal views of the device of FIG. 3, in accordance with an embodiment of the invention.

FIG. 5 is a schematic internal view of terminal 36, in accordance with an embodiment of the invention. In this figure, case 52 is inverted and shown from the inside. NFC reader 62 is mounted in case 52 in a location that will be directly below NFC chip 50 when tag 26 is held properly in receptacle 54. Thus, NFC reader 62 reads the UID of the tag that is actually in the receptacle at any given time. Thus, the tag removal mechanism will be actuated to unlock a tag with a given UID only as long as this tag is actually in the receptacle, as verified by the NFC reader. This arrangement is useful in preventing fraudulent use of terminal 36, for example to foil an attempt by a customer to unlock the tag on a given item after having actually paid for a different (less expensive) item.

Figure 6:
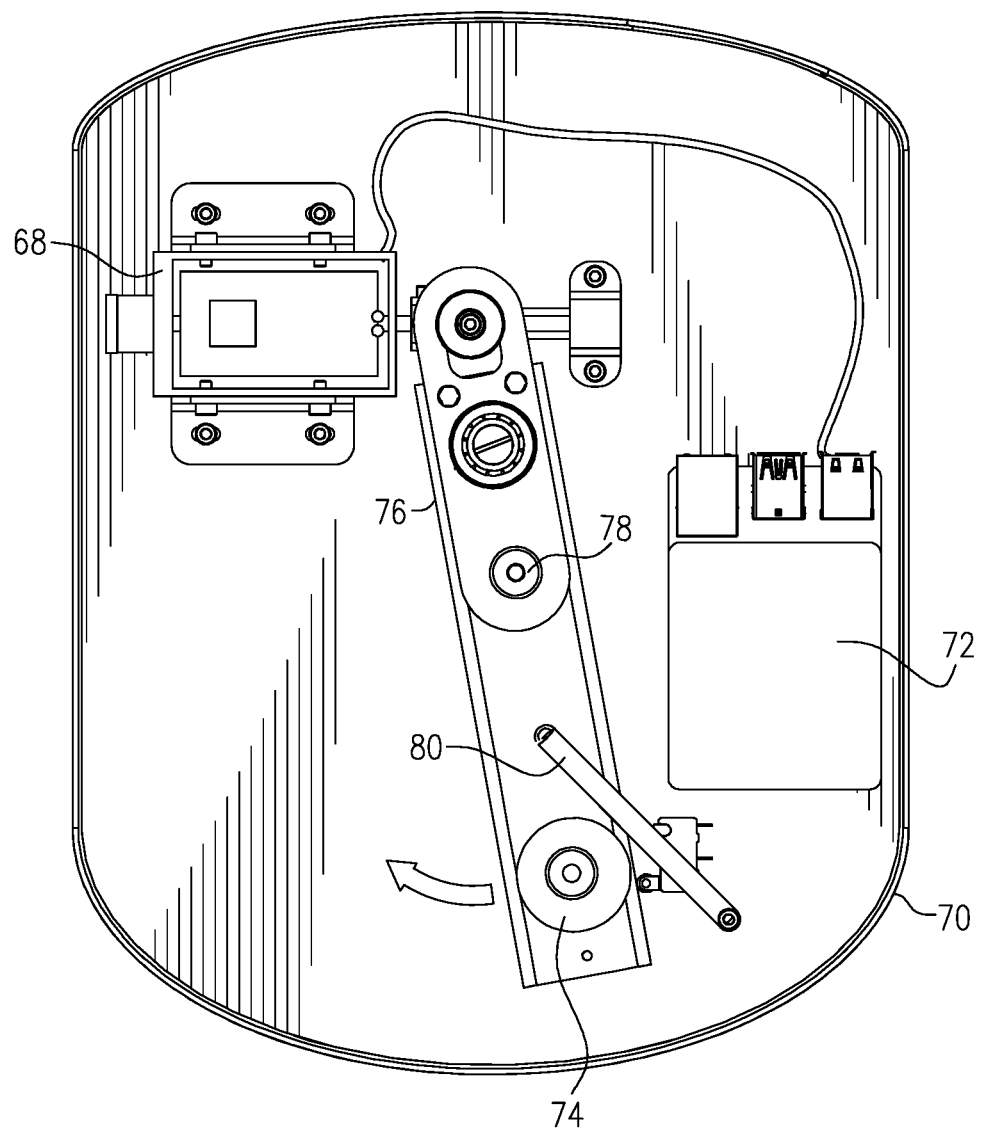

FIG. 6 is a schematic internal view of terminal 36, showing a base 70 of the terminal with the upper part of case 52 removed, in accordance with an embodiment of the invention. An electronics unit 72 comprises controller 60 and driver 66, as well as other circuit components. Some of the electronic components of terminal 36, such as the network interface, are omitted from this figure for the sake of simplicity.

The tag removal mechanism in terminal 36 comprises a magnet 74, which is attached to the end of a motion arm 76. The opposite end of motion arm 76 is attached to actuator 68. Motion arm 76 comprises a rotational pivot between its two ends and thus rotates between a rest position, which is shown in FIG. 6, and an actuation position, in which magnet 74 is positioned directly below indentation 58. Spring 80 normally holds arm 76 in the rest position, in which magnet 74 is farther from indentation 58 and thus does not affect tag 26 in receptacle 54 because the magnetic field exerted by magnet 74 drops sharply with distance.

When driver 66 applies current to actuator 68, the actuator pushes the end of motion arm 76 and thus rotates the motion arm about pivot 78 to shift magnet 74 from the rest position to the actuation position, as shown by the arrow in FIG. 6. The magnetic field of magnet 74 is sufficiently strong to open magnetic lock 48 and free fastener 44 (FIG. 2) when the magnet is in the actuation position, close to fastener 44, so that the customer can remove tag 26 from the article of clothing or other item of merchandise to which it was attached. As long as magnet 74 is in the rest position, farther from fastener 44, the magnetic field in the vicinity of the fastener is not strong enough to open lock 48.

The tag removal mechanism that is shown in FIG. 6 is advantageous in being simple, compact, and reliable. Alternatively, other mechanisms for shifting magnet 74 between rest and actuation positions in terminal 36, or otherwise actuating a magnet in the terminal to free tag 26, will be apparent to those skilled in the art after reading the present description and are considered to be within the scope of the present invention. For example, in an alternative embodiment (not shown in the figures), an electromagnet is fixed in the terminal below indentation 58. In this case, the tag removal mechanism is actuated by applying a current to the electromagnet, and mechanical motion is not needed.

Method of Operation

Figure 7:
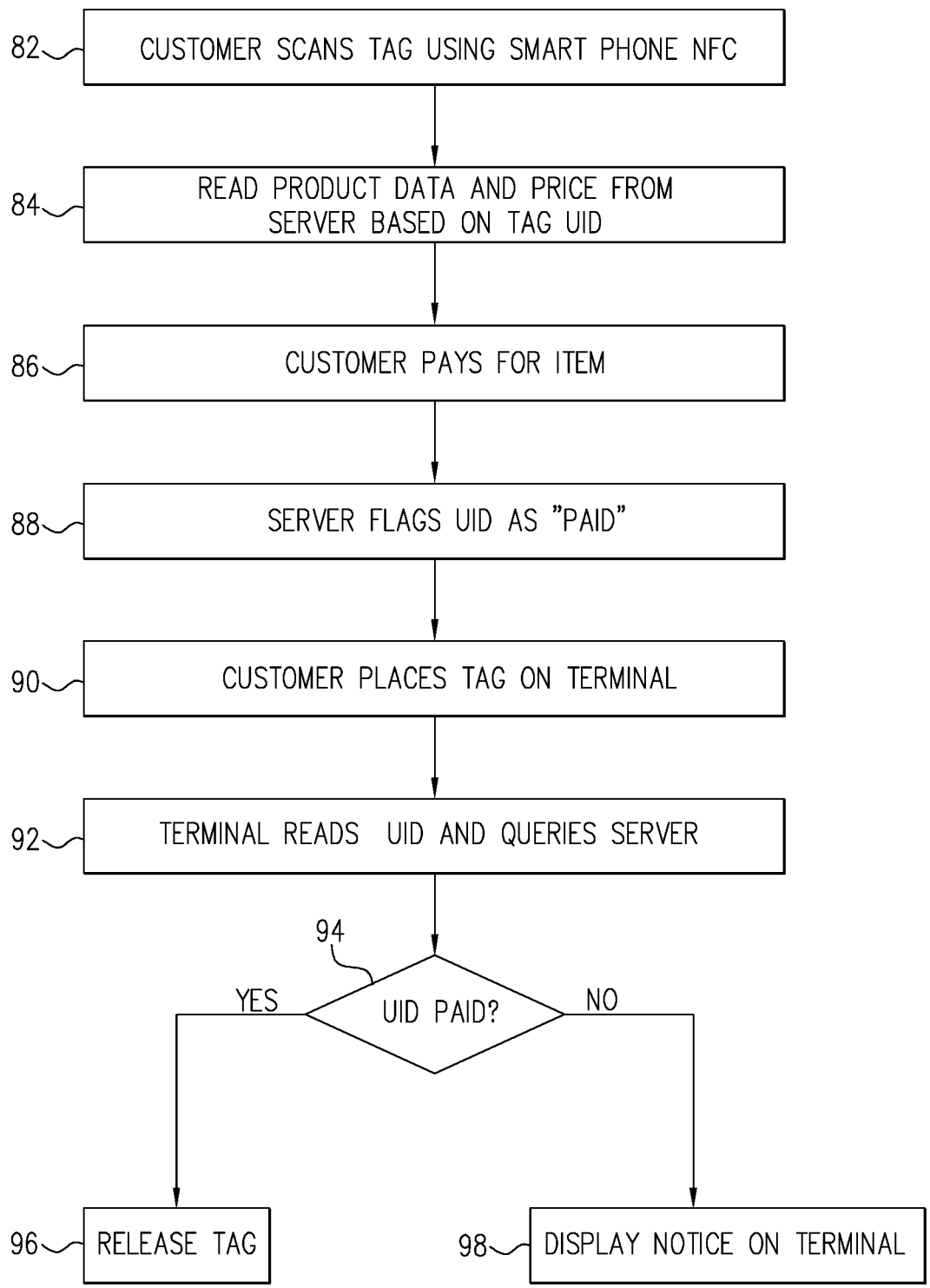
FIG. 7 is a flow chart that schematically illustrates a method for automatic handling of security tags, in accordance with an embodiment of the invention.

FIG. 7 is a flow chart that schematically illustrates a method for automatic handling of security tags, in accordance with an embodiment of the invention. The method is described here with reference to the components of system 20 (FIG. 1), including security tag 26 and terminal 36. Alternatively, the principles of this method may be applied in other settings in which a self-service tag removal device is deployed.

To initiate the method, a customer selects an item of merchandise and scans security tag 26 using a suitable NFC reader, at a scanning step 82. For example, the customer may use the NFC reader in her smartphone 28, operating under the control of an on-line purchase application running on the smartphone, to read the UID of tag 26. The smartphone transmits a query to server 32 with respect to the UID. Upon receiving the query, server 32 looks up and reads the record in database 34 corresponding to the UID of the tag, at a data reading step 84. Server 32 transmits to smartphone 28 a query response, including product and price information with respect to the item of merchandise to which tag 26 is attached. The purchase application on smartphone 28 displays this information to the customer and prompts the customer to pay for the item, for example using a credit card or other means of payment, at a payment step 86. Once server 32 is informed that the payment has been made, the server flags the UID of tag 26 as "paid," at a transaction completion step 88.

The customer can now place tag 26 (still attached to the item of merchandise) in the receptacle on terminal 36, in a tag placement step 90. The NFC reader in terminal 36 reads the UID of tag 26 and transmits a query to server 32 with respect to the UID, at a query transmission step 92. Server 32 looks up the UID in database 34 and returns an authorization message to terminal indicating whether or not this UID is flagged as "paid," at a UID response step 94. If the "paid" flag is set, terminal 36 actuates its tag removal mechanism to release the tag from the item of merchandise, at a tag release step 96. Otherwise, the terminal presents a notification on display screen 56 indicating that purchase of the item has not been completed, at a refusal notification step 98.

In an alternative embodiment, the tag removal terminal may also serve as a self-service point-of-sale terminal. In this case, when the customer places the tag (attached to an item of merchandise) in the receptacle on the terminal, the terminal display screen will first prompt the customer to make payment for the item. In this case, the customer may pay for the item by inputting a credit card or other means of payment to a suitable reader in the terminal. Once the purchase has been completed, the terminal controller actuates the tag removal mechanism, thus enabling the customer to remove the security tag.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electromechanical device, comprising:
   a case, comprising a receptacle configured to receive a magnetic security tag that is attached to an item of merchandise;
   a wireless transceiver, which is contained in the case and is configured to read identification data that is encoded in the security tag while the security tag is in the receptacle;
   a tag removal mechanism, which is contained in the case and comprises a magnet, and which is configured to shift the magnet between an actuation position in proximity to the receptacle and a rest position in which the magnet is farther from the receptacle than in the rest position;
   a network communication interface; and
   a controller, which is configured to receive the identification data from the wireless transceiver, to transmit, via the network communication interface, a query to a server with respect to the identification data, to receive, via the network communication interface, an authorization from the server with respect to the item of merchandise to which the security tag is attached, and responsively to the authorization, to actuate the tag removal mechanism to shift the magnet to the actuation position so as to release the security tag from the item of merchandise.

2. The device according to claim 1, wherein the receptacle comprises an indentation having a size and shape chosen to match a protrusion of the magnetic security tag.

3. The device according to claim 1, wherein the wireless transceiver comprises a near-field communication (NFC) reader.

4. The device according to claim 1, wherein the tag removal mechanism comprises:
   a motion arm having a first end to which the magnet is attached; and
   an actuator coupled to move a second end of the motion arm, opposite the first end, so as to shift the magnet from the rest position to the actuation position in response to an actuation signal from the controller.

5. The device according to claim 4, wherein the motion arm comprises a rotational pivot between the first and second ends of the motion arm, and wherein the actuator is coupled to shift the second end so as to rotate the motion arm about the pivot, thereby rotating the first end between the rest position and the actuation position.

6. The device according to claim 5, wherein the actuator comprises a solenoid.

7. The device according to claim 1, wherein the controller is configured to actuate the tag removal mechanism to release the security tag only while the wireless transceiver indicates that the security tag for which the authorization was received is in the receptacle.

8. The device according to claim 1, and comprising a display screen, wherein the controller is coupled to present information on the display screen regarding the authorization with respect to the item of merchandise.

9. The device according to claim 8, wherein the authorization indicates that a customer has purchased the item of merchandise, and wherein the controller is configured, in response to a message from the server, to present a notification on the display screen indicating that purchase of the item has not been completed.

10. A method for security tag removal, the method comprising:
- providing a terminal comprising a receptacle, which is configured to receive a magnetic security tag that is attached to an item of merchandise;
- using a wireless transceiver in the terminal, reading identification data that is encoded in the security tag while the security tag is in the receptacle;
- transmitting a query from the terminal to a server with respect to the identification data;
- in response to the query, receiving an authorization from the server with respect to the item of merchandise to which the security tag is attached; and
- responsively to the authorization, actuating a magnet in the terminal so as to release the security tag from the item of merchandise.

11. The method according to claim 10, wherein the receptacle comprises an indentation having a size and shape chosen to match a protrusion of the magnetic security tag.

12. The method according to claim 10, wherein the wireless transceiver comprises a near-field communication (NFC) reader.

13. The method according to claim 10, wherein actuating the magnet comprises shifting the magnet to an actuation position in proximity to the receptacle from a rest position in which the magnet is farther from the receptacle than in the rest position.

14. The method according to claim 13, wherein the magnet is attached is attached to a first end of a motion arm, and wherein shifting the magnet comprises moving a second end of the motion arm, opposite the first end, so as to shift the magnet from the rest position to the actuation position.

15. The method according to claim 14, wherein the motion arm comprises a rotational pivot between the first and second ends of the motion arm, and wherein moving the second end of the motion arm comprises rotating the motion arm about the pivot, thereby rotating the first end between the rest position and the actuation position.

16. The method according to claim 15, wherein rotating the motion arm comprises applying an electrical current to a solenoid.

17. The method according to claim 10, wherein actuating the magnet comprises applying a current to an electromagnet.

18. The method according to claim 10, wherein actuating the magnet comprises releasing the security tag only while the wireless transceiver indicates that the security tag for which the authorization was received is in the receptacle.

19. The method according to claim 10, and comprising presenting information via a user interface of the terminal regarding the authorization with respect to the item of merchandise.

20. The method according to claim 19, wherein the authorization indicates that a customer has purchased the item of merchandise, and wherein presenting the information comprises presenting, in response to a message from the server, a notification indicating that purchase of the item has not been completed.

* * * * *